United States Patent [19]

Wiuniski

[11] 3,948,221
[45] Apr. 6, 1976

[54] LIVESTOCK WATERING TROUGH

[75] Inventor: Emil L. Wiuniski, Mesa, Ariz.

[73] Assignee: Corral Industries, Incorporated, Phoenix, Ariz.

[22] Filed: June 26, 1974

[21] Appl. No.: 483,224

[52] U.S. Cl. .................................. 119/78; 119/73
[51] Int. Cl.² ........................................... A01K 7/00
[58] Field of Search .............................. 119/78–80, 119/73, 61

[56] References Cited
UNITED STATES PATENTS

| 649,436 | 5/1900 | Cooper | 119/79 |
| 1,251,590 | 1/1918 | Stewart | 119/80 X |
| 2,830,558 | 4/1958 | St. Pierre | 119/61 X |
| 3,745,977 | 7/1973 | Martin | 119/78 X |

Primary Examiner—Louis G. Mancene
Assistant Examiner—J. N. Eskovitz
Attorney, Agent, or Firm—Warren F. B. Lindsley

[57] ABSTRACT

A self contained rectangular fiberglass watering trough supportable by hangers and mountable on a platform or pedestal and defining a water holding cavity containing a novel detachable cover over a part of the cavity covering a valve means for controlling water flow into the cavity.

7 Claims, 7 Drawing Figures

LIVESTOCK WATERING TROUGH

BACKGROUND OF THE INVENTION

This invention is directed to livestock watering apparatus and more particularly to precast or molded plastic or fiberglass troughs containing a novel detachable cover over that portion of the trough containing the water valving means.

1. Field of the Invention

This invention relates to livestock watering troughs employing a slow moving stream of water constantly flowing through the trough wherein its particular design configuration prevents the livestock from damaging its valving arrangement while making it readily available for adjustment and repair.

2. Description of the Prior Art

Prior art devices have relied on water movement through a drinking trough to keep the water fresh and from freezing in cold weather, however, none have been effective in preventing the livestock from tampering with its valving means. Therefore, a need exists for a better watering trough which may be easily cleaned, which functions effectively in warm and cold weather, can be inexpensively manufactured on a production line basis, and its valving mechanism although readily available for adjustment and repair is covered and protected from the livestock.

SUMMARY OF THE INVENTION

It is therefore, one object of this invention to provide a new and improved livestock watering trough.

Another object of this invention is to provide a new and improved precast or molded plastic or fiberglass watering trough which is insulated below its watering cavity to preserve the temperature of its content and to effectively eliminate condensation below the cavity with the resulting water saturated trough supporting soil.

A further object of this invention is to provide a new and improved watering trough for livestock wherein its frame is encased in insulation to fill the space that varmints like to occupy.

A still further object of this invention is to provide an improved livestock feeding trough employing a novel easily detachable cover over that part of its water container cavity which prevents livestock from gaining access to the valving mechanism.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
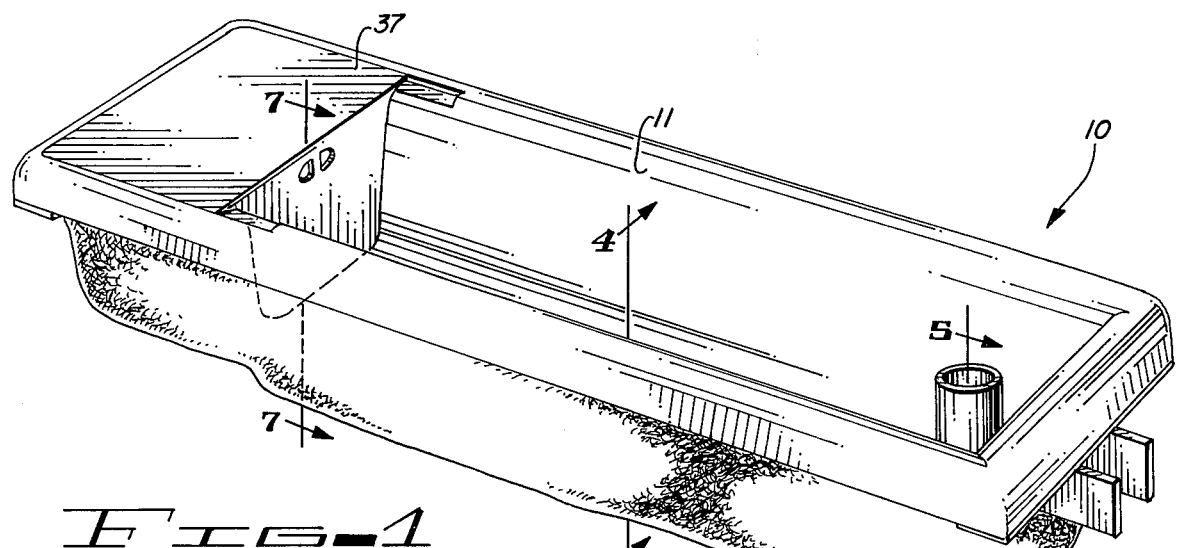
FIG. 1 is a front perspective view of a livestock watering trough incorporating the features of this invention.

Referring more particularly to the drawing by characters of reference, FIG. 1 discloses a livestock watering trough 10 arranged for hanging on spaced upright supports (not shown) fitted or seated on a concrete platform (also not shown). It should be noted that the terminology livestock watering trough is intended to cover the usage of this trough for any feeding and watering purpose for animals of any type such as, for example, swine, cattle, horses, sheep and the like.

The trough may be precast to any form defining a concave surface 11 which will hold water and may be sloped to one corner, if so desired. As shown more clearly in FIGS. 4 and 5 the outer surface of the trough may be formed from a precast or molded plastic or fiberglass 12 of one piece which defines pockets 13 underneath the turned over edges of the concave surface 11 and between it and the inside and end walls of the cavity of the trough.

Figure 2:
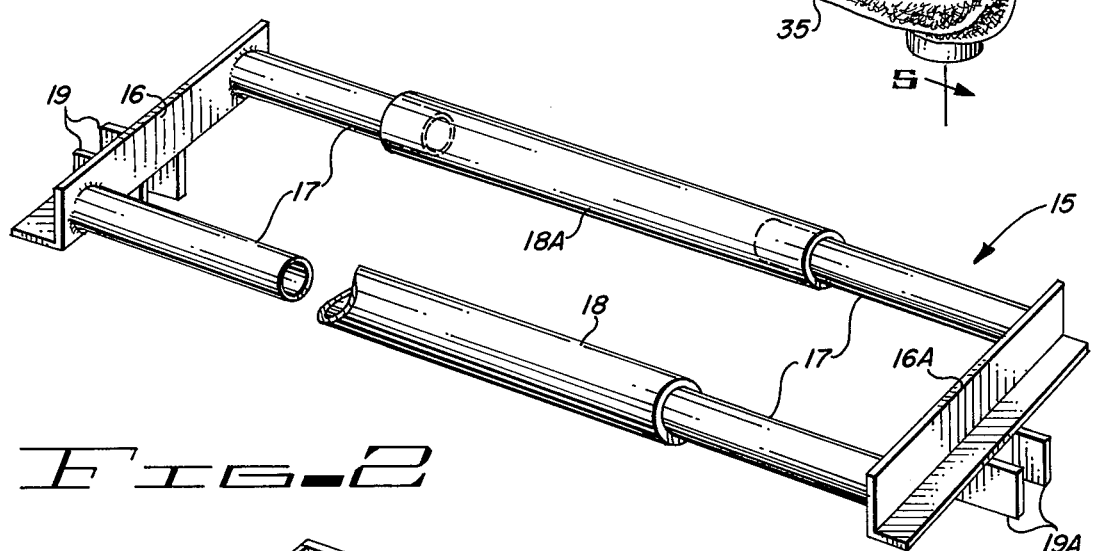
FIG. 2 is a perspective view of the framework of the trough shown in FIG. 1.
Figure 5:
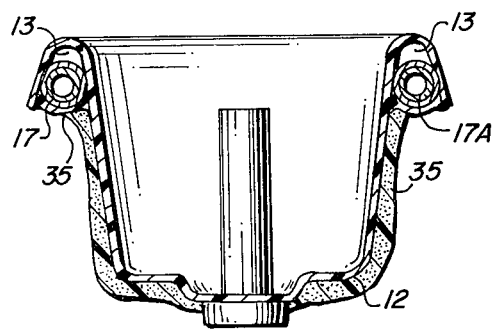
FIG. 5 is a cross-sectional view of the trough shown in FIG. 1 taken along the line 5—5.

As shown in FIG. 2, the precast plastic or fiberglass trough of FIG. 1 is supported by a framework 15 which may comprise a pair of right angular end members 16 and 16A having a pair cylindrical members 17 and 17A attached thereto which are arranged to extend longitudinally of the trough within the pockets 13 as shown in FIG. 5. These tubular members are interconnected in a telescopic manner by overlapping cylindrical members 18, 18A.

Although it is desirable to form end members 16 and 16A and cylindrical members 17 and 17A of iron, steel, or aluminum any suitable material may be used such as plastic. The cylindrical members 18, 18A may be formed of any material also such as the materials mentioned above, however, to lighten the weight of the framework and to conserve materials paper cylindrical members may be used since the strength of the trough is obtained from its fiberglass material.

As shown in FIGS. 1 and 2 the end members 16 and 16A are each provided with a pair of spaced hanger flanges 19, 19A which are intended to be suitably fastened to upright supporting posts (not shown) which are spacedly arranged for supporting the trough above the ground or on suitable platforms also not shown. Although a pair of hanger flanges are shown at each end of the trough any suitable fastening means may be used of either one flange or other suitable clamping type structures.

Figure 3:
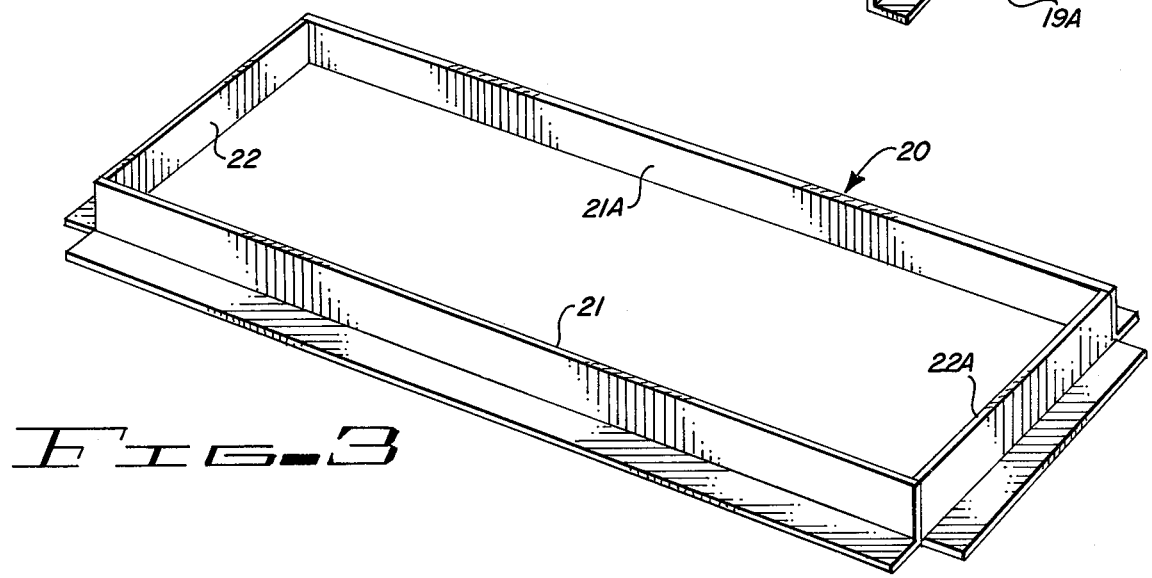
FIG. 3 is a perspective view of a modification of the framework of the trough shown in FIG. 1.

FIG. 3 illustrates another frame structure 20 for supporting the fiberglass trough in the manner disclosed above which is formed from a pair of right angular side members 21, 21A and a pair of right angular end members 22, 22A. These members are suitably fastened together such as by welding to form a rigid rectangular frame structure over and around which the trough is molded.

It should be recognized, as shown in FIG. 1, that the sides and ends of the trough forming cavity 11 extend around its ends to form a continuous uninterrupted surface with rounded corners to eliminate pockets which collect dirt and unused food products.

When the trough is used for watering purposes, it is fitted with plumbing fixtures to provide controlled water flow and drainage for the trough.

Figure 4:
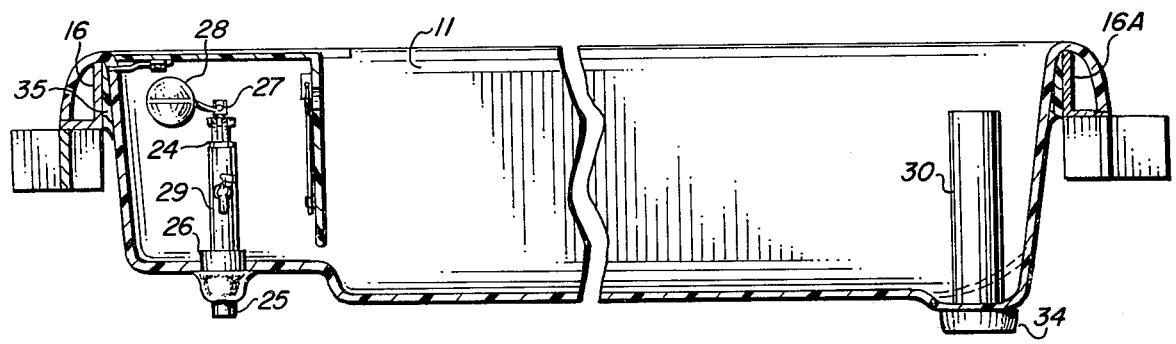
FIG. 4 is a cross-sectional view of the trough shown in FIG. 1 taken along the line 4—4.

FIG. 4 discloses the well known float valve 24 having an inlet pipe 25 entering into the bottom thereof and communicating with the inside of the trough and more particularly watering cavity 11. Float valve 24 is provided with a control valve (not shown) within the confines of the trough underneath the watering cavity 11 which is accessible to be closed or partially closed as hereinafter explained at its upper end by valve 24. Valve 24 controls the flow of water from pipe 25 into trough 10.

As shown in FIG. 4, inlet pipe 25 is positioned in a coupling 26 mounted in the bottom of cavity 12 usually at one end of the trough. Valve 24 is actuated as a function of the fluid level in the tank by a lever 27 coupled to a float 28 located within the cavity of the trough in a wellknown manner.

Valve 24 may be of any suitable type used for toilets and accordingly will not be shown or described herein since it is not the point of novelty of this invention. Lever 27 is attached to valve 24 to open and close it depending on the position of float 28.

Pipe 29 interconnecting pipe 25 with valve 24 at coupling 26 may be provided with a suitable opening or part (not shown) which is not controlled by valve 24 so that a limited amount of water will constantly flow into the trough at all times. This method has been used to attempt to keep the water from freezing and to a limited extent has been successful, however, in cold weather the tank would freeze thereby not only keeping the livestock from water but at times depending on the material from which it was formed destroying the watering trough.

An overflow pipe 30 is mounted on the opposite end of the trough from valve 24 which is suitably connected through well-known coupling means 34 to a drain pipe extending through a platform on which the trough is mounted and into a sump or drainage system or ditch as so desired. This overflow pipe drains off the water continually flowing through the trough due to the controlled but continuous flow from pipe 29.

In accordance with the invention, the precast or molded trough is at least partially covered on the underside with a suitable insulation such as a thermosetting plastic material 35 which may be placed over and around the framework 15 when the trough, shown in FIGS. 1 and 2, is formed. The trough at that time should have its pipe 25 installed therein so that it can be covered by the plastic during its curing period. This method of insulating the underside of the watering cavity forms a continuous layer of close cell plastic material which substantially eliminates condensation along the bottom of the cavity as well as within any space that remains between the underside of the watering cavity and the framework and also eliminates or greatly reduces the spaces sought by varmints.

Figure 6:
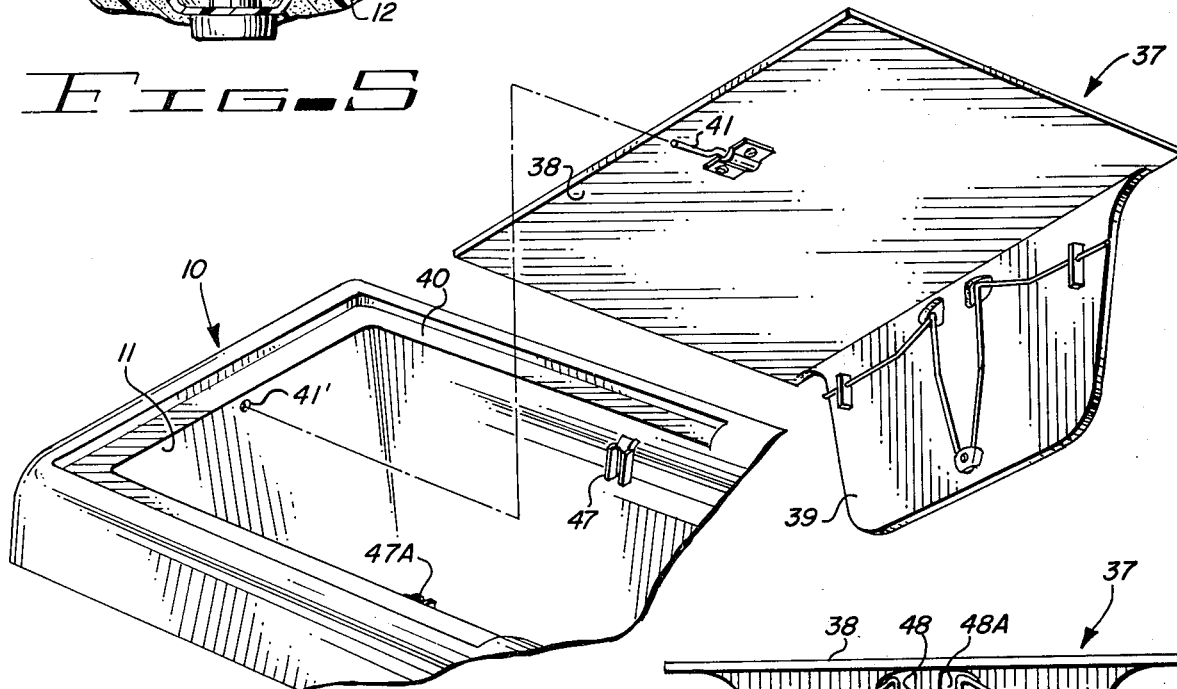
FIG. 6 is an exploded partial view of the trough and detachable cover arranged for concealing the water valving mechanism.
Figure 7:
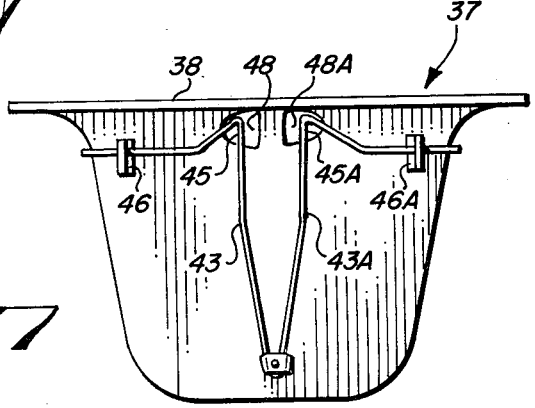
FIG. 7 is a cross-sectional view of FIG. 1 taken along the line 7—7.

As shown in FIGS. 1, 6 and 7, the valving means is enclosed by a suitable cover 37 to keep the animals from disturbing this mechanism. This cover comprises a right angular member formed of a horizontally positioned member 38 and a vertically positioned member 39 extending towards the bottom of the trough permitting water to flow from pipe 29 under member 39 toward overflow pipe 30. Member 38 is arranged to fit within a groove 40 formed in the top surface of the trough over the valving mechanism and supports a prong interlocking mechanism 41 which is so positioned on the underside of member 38 to fit into an opening 41' in the end surface of the trough as shown in FIG. 6.

In order to lock the cover in position on the trough a spring biasing means 42 is provided which is mounted on the inside of the cover when positioned over the valve mechanism.

This spring biasing means, as shown in FIG. 7, comprises a pair of curved finger members 43, 43A which are fixedly attached to member 39 of the cover 37 at a point 44 and extend upwardly to the underside of member 38 where elbow 45, 45A are arranged to guide the free ends of the finger members 43, 43A laterally of the cover and the trough in guides 46, 46A. In normal spring biased position the free ends of these finger members extend outwardly of the cover member into suitable catches 47, 47A mounted in the cavity of the trough at the valve mechanism end thereof.

In order to retract the free ends of the finger members 43, 43A to either release the cover from the trough or to position the cover on the trough, the finger members must be biased toward each other. This is accomplished by merely forcing the resilient finger members toward each other and is accomplished by the operator placing two of his fingers through apertures 48, 48A formed in member 39 of the cover and forcing the finger members toward each other.

Thus by biasing the finger members together and then sliding member 38 of cover 37 along groove 40 of trough 10, prong 41 may be slid into opening 41' in the trough. In this position the finger members are released and their free ends then move into catches 47, 47A to lock the cover in place over the valving mechanism.

To remove the cover from the trough the operator places two of his fingers of one hand through apertures 48, 48A, grips finger members 43, 43A, biases them together to retract their free ends from catches 47, 47A and then slides cover 37 along grooves 40 to retract prong 41 from opening 41'. The cover may then be lifted off of the trough exposing the valving mechanism.

In view of the fact that the spring biasing means 42 and its hardware are all mounted underneath the cover in a concealed position the livestock can not get to it to release the cover to damage the valving mechanism. Only a human with finger capable of reaching into apertures 48, 48A can reach the spring biasing means to remove the cover.

Thus, a new and improved livestock feeding and watering trough is provided which is precast or molded from plastic or fiberglass and insulated in a new manner to provide an improvement over any trough found in the market place.

Although but one embodiment of the present invention has been illustrated and described, it will be apparent to those skilled in the art that various changes and modifications may be made therein without departing from the spirit of the invention or from the scope of the appended claims.

What is claimed is:
1. A trough for livestock comprising:
   a molded plastic body member, the walls of which define an elongated closed ended concave cavity extending along its length,
   said walls of said cavity at the periphery of the opening outlining said cavity being turned back on themselves to define a pocket for receiving a supporting framework for the trough, said pocket extending around the cavity, a framework mounted within said pocket and having means at each end for mounting said member forming said cavity on two spaced upstanding pedestals, a water inlet pipe extending into one end of said cavity, valve means connected to said water inlet pipe mounted within and at one end of said cavity, cover means detachably mounted on the periphery of said cavity over said valve means and extending into said cavity for concealing said valve means from the livestock, means for detachably fastening said cover means to said trough, and insulating means for substantially filling said pocket for sealing said framework in said pocket, said cover means comprising a substantially right angular configuration having one leg formed to cover said valve means and fit against one end of said cavity adjacent said valve means and the other leg extending toward the bottom of said cavity and shaped to fit substantially the outline of the cross-section of said cavity, whereby said cover means conceals said valve means from the livestock and provides for the flow of water into all areas of said cavity.

2. The trough set forth in claim 1 wherein:

said insulating means covers the underside of said cavity.

3. The trough set forth in claim 1 wherein:

said trough comprises a continuous surface formed of fiberglass.

4. The trough set forth in claim 3 wherein:

said insulating means comprises a thermosetting plastic.

5. The trough set forth in claim 1 in further combination with a groove formed in the periphery of the outline of said cavity around said valve means for receiving the edges of said one leg of said cover means.

6. The trough set forth in claim 1 wherein:

said means for detachably connecting said cover to said trough comprises a spring mounted on the underside of said cover means on said other leg of said cover means and biased to extend into a protrusion on the side of said cavity within the space concealed by said cover, and aperture means in said other leg of said cover means exposing said spring, whereby a human may reach into the space concealed by said cover means to bias said spring out of said protrusion to release said cover means from said trough to expose said valve means.

7. The trough set forth in claim 6 wherein:

said spring comprises a V-shaped configuration having each of its leg members biased to extend outwardly thereof into protrusions on opposite sides of said cavity, whereby a human reaching into said aperture means biases said leg members toward each other to release them from said protrusions to release said cover means from said trough.

* * * * *